United States Patent
Beaumont et al.

(10) Patent No.: US 8,897,422 B2
(45) Date of Patent: Nov. 25, 2014

(54) NETWORK TESTING

(75) Inventors: Stephen C Beaumont, London (GB); Christopher B Hatch, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 84 days.

(21) Appl. No.: 13/701,297

(22) PCT Filed: May 27, 2011

(86) PCT No.: PCT/GB2011/000822
§ 371 (c)(1),
(2), (4) Date: Nov. 30, 2012

(87) PCT Pub. No.: WO2011/151614
PCT Pub. Date: Dec. 8, 2011

(65) Prior Publication Data
US 2013/0070908 A1 Mar. 21, 2013

(30) Foreign Application Priority Data
Jun. 1, 2010 (EP) .................... 10251013

(51) Int. Cl.
H04M 3/22 (2006.01)
H04M 1/24 (2006.01)
H04M 3/30 (2006.01)
H04B 3/46 (2006.01)
H04M 3/32 (2006.01)

(52) U.S. Cl.
CPC ................ H04M 3/32 (2013.01); H04M 3/306 (2013.01); H04B 3/46 (2013.01)
USPC .......................................... 379/21

(58) Field of Classification Search
CPC .................................. H04M 3/28; H04M 3/32
USPC .............................................. 379/21
See application file for complete search history.

(56) References Cited

U.S. PATENT DOCUMENTS

| 7,593,833 B2* | 9/2009 | Savoor et al. ................. 702/186 |
| 2003/0235274 A1 | 12/2003 | Afzal |
| 2009/0112642 A1 | 4/2009 | Uekane et al. |

FOREIGN PATENT DOCUMENTS

| EP | 2 107 772 | 10/2009 |
| WO | 01/76209 | 10/2001 |
| WO | WO 01/76209 | 10/2001 |
| WO | 2007/050001 | 5/2007 |
| WO | WO 2007/050001 | 5/2007 |

OTHER PUBLICATIONS

International Search Report for PCT/GB2011/000822, mailed Jul. 25, 2011.

* cited by examiner

*Primary Examiner* — Sonia Gay
(74) *Attorney, Agent, or Firm* — Nixon & Vanderhye P.C.

(57) ABSTRACT

The present invention provides a method of testing a transmission line from a copper access network. The transmission line is tested to generate values for a plurality of network parameters. Using previously determined test results, it is possible to calculate an estimate of the length of the transmission line based on the values of each of the measured parameters. These estimates of the transmission line length can then be used to compute a weighted average of the transmission line length. An inference of the condition of the transmission line can be made by comparing the estimates of the length of the transmission line with the weighted average length.

20 Claims, 9 Drawing Sheets

NETWORK TESTING

This application is the U.S. national phase of International Application No. PCT/GB2011/000822, filed 27 May 2011, which designated the U.S. and claims priority to EP Application No. 10251013.8, filed 1 Jun. 2010, the entire contents of each of which are hereby incorporated by reference.

BACKGROUND AND SUMMARY

The present invention provides a testing method and system for a telecommunications network, and in particular a method and system that can analyse measured test data and make one or more inferences regarding the nature of the network under test.

The access network of telecommunications networks conventionally comprises copper pairs, which are used to connect customer premises to a local exchange. Voice and data signals are sent to and from the customer premises to the local exchange and onwards to the core network. Data signals are often DSL (Digital Subscriber Line) signals which allow data signals to be multiplexed in the higher frequency regions beyond the portion of the frequency spectrum which is used for the voice signal. Even though there is a trend for optical fiber to be installed into the access network in order to be able to provide data at even greater speeds, it is clear that legacy copper access networks will still be used for a significant period of time.

FIG. 1 shows a schematic depiction of a conventional access network 100 which comprises local exchange 110, a plurality of primary nodes 120 (also known as primary cross-connection points [PCPs]) and a plurality of secondary nodes 130 (also referred to as distribution points (DPs). The local exchange 110 is connected to each of the primary nodes 120 via exchange cables 115. Conventionally, in the United Kingdom, a primary node takes the form of a green roadside cabinet. Each of the primary nodes 120 is connected to one or more secondary nodes 130 via a distribution cable 125. The secondary nodes are often located at, or near to, a telephone pole. Each of the secondary nodes is connected to one or more customer premises 140 via a drop cable 135. The drop cable may be routed to the customer premises on an overhead cable route via a telephone pole or via an underground cable route, for example within a duct. For the sake of clarity, FIG. 1 shows only the connections from one of the primary nodes to the secondary nodes: it should be understood that all of the primary nodes will be connected to a number of secondary nodes The exchange cables are jointed to the distribution cables at the primary nodes and the distribution cables are connected to the drop cables at the secondary nodes. Furthermore, there may be further inline cable joints located between the local exchange and a primary node, or between a primary node and a secondary node. Poorly made cable joints, water ingress into the housings holding the cable joints and damage to the cable sheaths can all lead to faults occurring on the circuit between the local exchange and a particular customer premises. A fault in a primary node, or in a cable joint located between the local exchange and a primary node may cause a fault that effects multiple customers.

FIG. 2 shows a schematic depiction of the local exchange 110 which comprises telephony switch 112, network testing equipment 114, operational support systems (OSSs) 116 and OSS workstations 118. The exchange cables are connected to the telephony switch which is in turn connected to a core network node 150 via backhaul cable 155. The local exchange may also comprise equipment for routing data to and from the core network (and also to and from the core network of other communications providers) but as this is not relevant to the present invention it is not shown in FIG. 2 for the sake of clarity. The network testing equipment 114 is arranged such that it is able to interface with the exchange cables such that it can send test signals along one or more selected copper pairs. Testing may be carried out for a number of reasons, for example to characterise the performance of the network, to detect conditions that may indicate that faults may occur in the future or in response to customer complaints. In order to test a line it is necessary to disconnect it from the telephony switch so any planned testing is normally performed at a time at which the line is unlikely to be in use and the line will be checked to see if it is active before testing is commenced.

Both the telephony switch and the network testing equipment are in communication with the OSSs 116 which enable the operation and maintenance of the network to be controlled and monitored. One or more workstations 118 may be provided to allow operators to access the OSSs. It will be understood that the OSSs and/or the workstations may not be physically located at each of the local exchanges in a network but may instead be centralised in one or more network management centers which are remote from, but connected to, the local exchange.

As the circuit between the local exchange and customer premises comprises a pair of copper wires, it can be modelled using conventional electrical parameters. FIG. 3 shows a schematic depiction of a line 300 under test. The line is the combination of the exchange cable pair, distribution cable pair and drop cable pair for a particular circuit and comprises A wire 302 and B wire 304. FIG. 3 shows at the local exchange the line 300 has been disconnected from the telephony switch and has been connected to the network testing equipment 114. The line 300 is connected to terminal equipment 142 which is located at the customer premises 140. The terminal equipment may be a network termination module which comprises a socket to allow the connection of a telephone handset and/or DSL modem. Each of the lines 302, 304 has a resistance which depends upon its diameter and the distance from the local exchange to the terminal equipment 142. Each of the wires 302, 304 is coated with an insulating material, which may be a plastic material or paper. The function of the insulating material is to provide insulation between each wire and adjacent wires. Damage to the insulating material or oxidation of the metal of a wire can cause the resistance between two adjacent wires to fall.

The effectiveness of the insulation between wires 302, 304 can be determined by measuring the resistance R1 between the A wire 302 and the B wire 304 and the resistance R2 between the B wire 304 and the A wire 302. The resistances R1 and R2 may be different because of rectification as indicated by diodes D1 and D2. For a circuit in good condition, the resistances R1 and R2 are high, for example greater than 1 MΩ. Damage to the insulating material or oxidation will cause the resistances R1, R2 to fall by an amount which depends upon the severity of the damage or oxidation. If the insulating material is totally destroyed so that the A and B wires are physically touching each other, the values of resistances R1, R2 will depend upon the distance between the network testing equipment and the point of damage but will typically lie in the range 0 to 1500Ω. Oxidation can result in wires effectively touching each other.

Only the A and B wires 302, 304 of the line 300 being tested are disconnected. In the other lines which will be contained within a cable, the bias voltage of 50 volts is applied between the A wire and the B wire. In FIG. 3, the A wires of the other lines are collectively shown by a wire 310 which is connected at the switch 10 to earth. The B wires of the other lines are collectively shown by a wire 312 connected at the switch to a potential of −50 volts.

If the insulating material separating the A wire 302 or the B wire 304 from one of the adjacent A or B wires becomes damaged, or if one of the wires suffers oxidation, current may flow. The effectiveness of the insulation between the A and B wires 302, 304 and adjacent A and B wires can be determined by measuring the resistance R3 between A wire 302 and adjacent A wires 310, the resistance R4 between the A wire 302 and adjacent B wires 312, the resistance R5 between the B wire 304 and adjacent A wires 310, and the resistance R6 between the B wires 304 and adjacent B wires 312.

For a good circuit, the resistance values for R3, R4, R5, R6 are high, for example greater than 1 MΩ. Damage to insulating material may cause one or more of the resistances R3, R4, R5, R6 to fall by an amount which depends upon the severity of the damage. If the insulating material between the A wire 302 or the B wire 304 and an adjacent wire is totally destroyed so that the two wires are physically touching each other, the resistance between the two touching wires will depend upon the distance between the network testing equipment and the point of damage but will typically lie in the range 0 to 1500Ω. Oxidation can also result in two wires effectively touching each other.

The A and B wires 302, 304 and the insulating material between them act as a capacitor. In FIG. 3, the capacitance between the A and B wires is shown as having a value C1. The value of the capacitance between the A and B wires of a line will depend upon the length of the line. A break in the line 300 will reduce the value of capacitance C1 as measured from the network testing equipment. FIG. 3 also shows the capacitance C2 between the A wire 302 and earth and the capacitance C3 between the B wire 304 and earth.

Periodically, for example each night, the network test equipment measures the resistances R1, R2, R3, R4, R5, R6 and the capacitances C1, C2, C3 for each terminating line of the access network 100. The test equipment also checks if there is terminal equipment connected to the end of the line. The terminal equipment has a standard capacitance value. When terminal equipment is connected, the value of its capacitance is subtracted from the capacitance value measured by the test equipment to obtain the capacitance C1. Other measurements may be made, for example measuring the response to the application of a pre-determined voltage, insertion loss at one or more pre-determined frequencies, etc.

For each terminating line, the results of the tests are sent to the OSS such that the results can be stored in a database. If a fault condition is identified then the necessary repair can be scheduled as required. The possible faults include disconnection, short circuit, a fault battery voltage, an earth fault and low insulation resistance. This allows for trends in parameters to be analysed and if the trends indicate that a fault condition is likely to occur in the near future then preventative maintenance can be scheduled. By associating the results with the line with which they are associated then it is possible to correlate faults with particular nodes and/or cables, which assists in the identification of the location of a particular fault.

It is also possible for an engineer to initiate a test, either at a node or at a cable joint. The engineer has a test set which can implement the functionality of the network testing equipment and can measure the various resistance and capacitance values. The test set may be implemented in a laptop computer or similar portable device. In this case, as well as storing test data for later transmission to the OSSs, the test set may analyse the measured data and provide an indication to the engineer of the various parameters along with any likely fault condition or status.

WO2007/050001 discloses a method of determining the transmission properties of a telecommunication transmission line. A signal is sent over the transmission line and the received signal is analysed using a fast Fourier Transform. The results of this analysis include the line capacitance, resistance, inductance and conductance.

US 2003/235274 discloses a method for testing a telephone network to determine whether a line can support high speed data services. A mapping is created between low frequency measurements and average loop loss over a high frequency range. The average loop loss is then used to compute the equivalent working length of a line, which indicative of the ability of a line to support high speed data services.

According to a first aspect of the present invention there provided a method of testing a transmission line in a communications network, the communications network comprising a local exchange and a plurality of transmission lines connected to the local exchange, the method comprising the steps of: i) measuring a value for each of a plurality of transmission line parameters; ii) determining an estimate for the length of the transmission line for each of the plurality of transmission line parameters based on the associated value measured in step i) and a pre-determined further value associated with each of the plurality of transmission line parameters; iii) determining a weighted average transmission line length based on the plurality of transmission line length estimates determined in step ii); and iv) inferring the condition of the transmission line based on the weighted average determined in step iii) and the plurality of transmission line length estimates determined in step ii).

In a first embodiment of the present invention, in step iv) the ratio of the estimated transmission line length to the weighted average transmission line length is determined for each of the plurality of transmission line parameters and the condition of the transmission line is inferred in accordance with the plurality of ratios. The condition of the transmission line may be inferred as being acceptable if each of the plurality of ratios determined in step iv) are less than a first predetermined value. Alternatively, it can be inferred that the transmission line may have an unacceptable condition in the future if each of the plurality of ratios determined in step iv) are greater than the first predetermined value but less than a second predetermined value. Furthermore, it can be inferred that the transmission line has an unacceptable condition if each of the plurality of ratios determined in step iv) are greater than the second predetermined value.

In a second embodiment of the present invention, step iv) comprises the further steps of: a) for each of the plurality of transmission line parameters, determining a data point based on the weighted average transmission line length and the transmission line length estimate associated with each of the transmission line parameters; b) comparing the data point determined in step a) against a pre-determined distribution of data points; and c) inferring the condition of the transmission line based on the comparison made in step b).

In step c), the transmission line may be determined to have an acceptable condition if each of the data points determined in step a) is less than an upper bound and greater than a lower bound, the upper and lower bounds being determined from the distribution of data points. Alternatively, in step c), the transmission line can be determined to have an unacceptable condition if one or more of the data points determined in step a) is greater than the upper bound or lower than the lower bound.

The upper bound and the lower bound may comprise a pre-determined proportion of the data points which comprise the distribution of data points. The upper bound and the lower bound may be defined in accordance with a statistical parameter derived from the pre-determined distribution of data points; this statistical parameter may be the coefficient of variance of the pre-determined distribution of data points.

According to a second aspect of the present invention there is provided an apparatus comprising a processing unit, memory means and data storage means, the apparatus being configured, in use, to perform a method as described above. The apparatus may comprise a portable network testing apparatus.

According to a third aspect of the present invention there is provided a data carrier for use in a computing device, the data carrier comprising computer executable code which, in use, performs a method as described above.

BRIEF DESCRIPTION OF THE DRAWINGS

Embodiments of the present invention will now be described, by way of example only, with reference to the accompanying drawings in which.

DETAILED DESCRIPTION OF PRESENT EXAMPLE EMBODIMENTS

Figure 1:
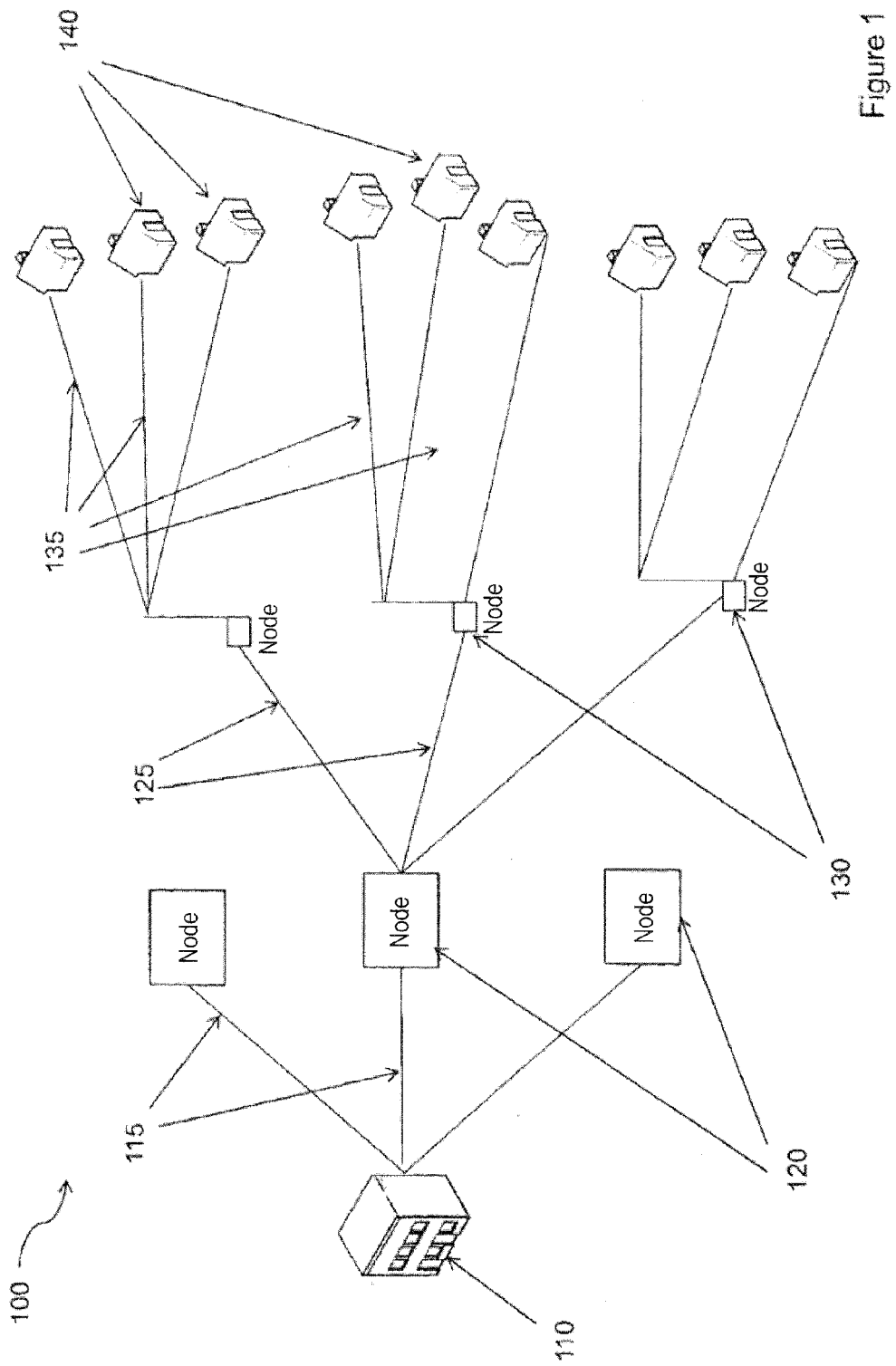
FIG. 1 shows a schematic depiction of a conventional access network.
Figure 2:
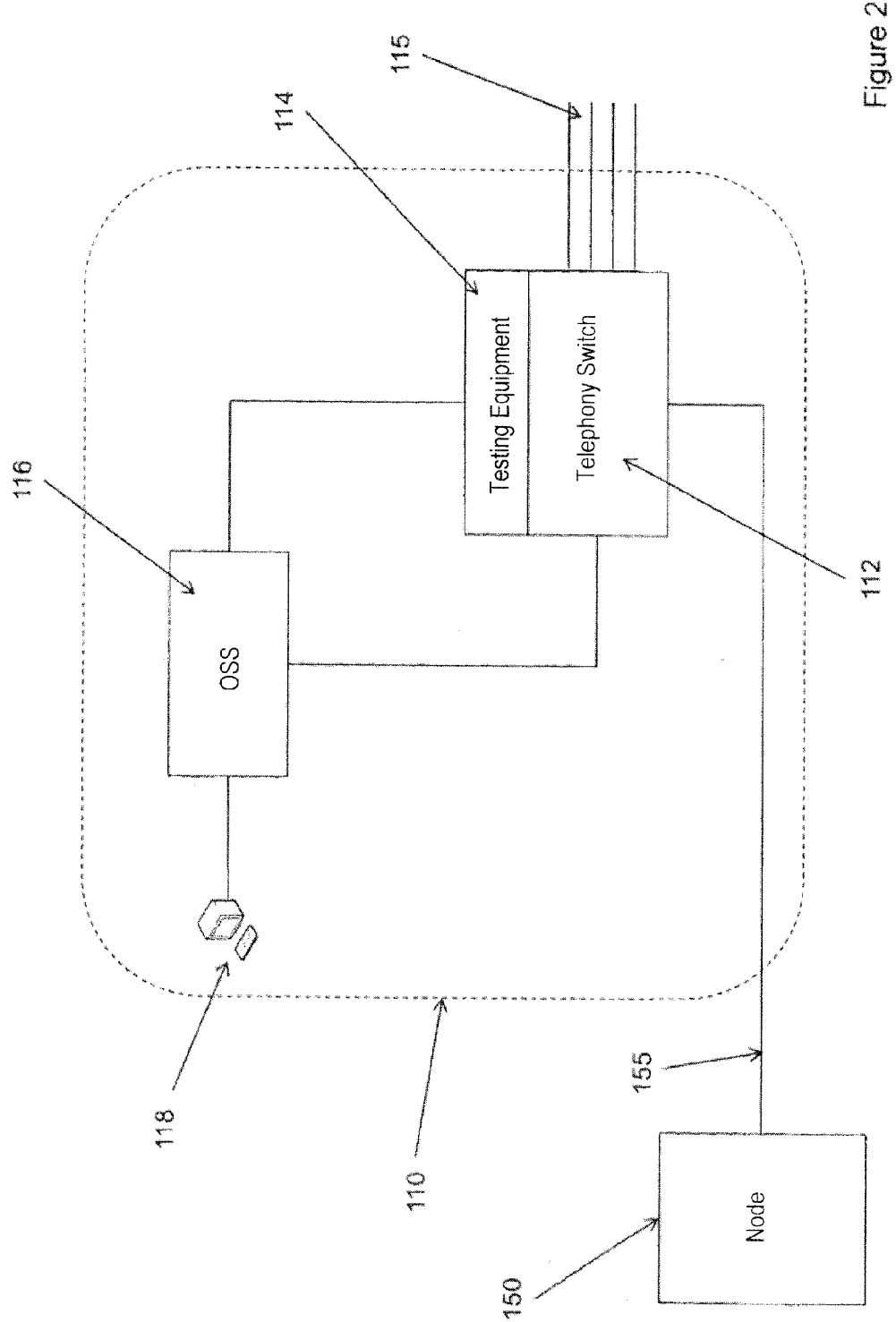
FIG. 2 shows a schematic depiction of a local exchange from the access network.

One of the issues that makes network testing complicated is that the electrical parameter values that are measured are dependent upon a number of different physical parameters, for example the length of the cable, the size of the metallic conductors in the cable, whether the conductors are made from copper or aluminium, the thickness, the material and condition of the insulation that is applied around the conductors, etc. Also, it is common for these physical parameters to vary along the route of a connection to a particular customer premises and it is rare for a network operator to have a comprehensive inventory of where cables have been installed and routed and the characteristics of each cable.

However, it has been determined that some electrical parameters that can be measured are, to varying extents, dependent mostly on the length of the cable route whilst being independent of the other factors and parameters that can affect the electrical characteristics of the cable. These can be measured and then used to determine the characteristic of the line under test and/or the diagnostic equipment being used to test the line. It has been found that the most suitable parameters are the capacitance value between the A wire and the B wire, the loop resistance and insertion loss. Other resistance parameters (such as the resistance of individual legs of the transmission line) or capacitance parameters (such as the capacitance between the A-wire (or B wire) and earth) may be used but it has been found they lead to lower quality results.

Using a large database (for example, greater than 10,000 measurements), it is possible to characterise the average electrical parameters of the cables that constitute the network; preferably these measurements are made on cables of a known length. By the application of standard statistical techniques it is possible to determine the relationship between the length of the cables and the measured parameters. By measuring a single cable, the length of which is unknown, it is possible to derive an estimation of the cable length from each of the measured parameter values. Furthermore, it is then possible to determine a weighted estimation of the cable length based on these derived values. Expressed formally, the weighted length, $L_W$, is given by $$L_W = \frac{w_C L_C + w_R L_R + w_I L_I}{w_C + w_R + w_I} \quad [1]$$

where $L_C$ is the length derived from the capacitance measurement, $L_R$ is the length derived from the resistance measurement, $L_I$ is the length derived from the insertion loss measurement, $w_C$ is the weighting factor associated with the length derived from the capacitance measurement, $w_R$ is the weighting factor associated with the length derived from the resistance measurement and $w_I$ is the weighting factor associated with the length derived from the insertion loss measurement. It has been found that the length derived from the capacitance measurement, $L_C$, is the value that is least dependent on cable parameters other than the length of the cable and thus this derived value should be given a greater weighting value than the other derived length values. An example of suitable weighting values are $w_C=3$ and $w_R=w_I=1$, although it will be understood that other weighting values may be used.

Figure 3:
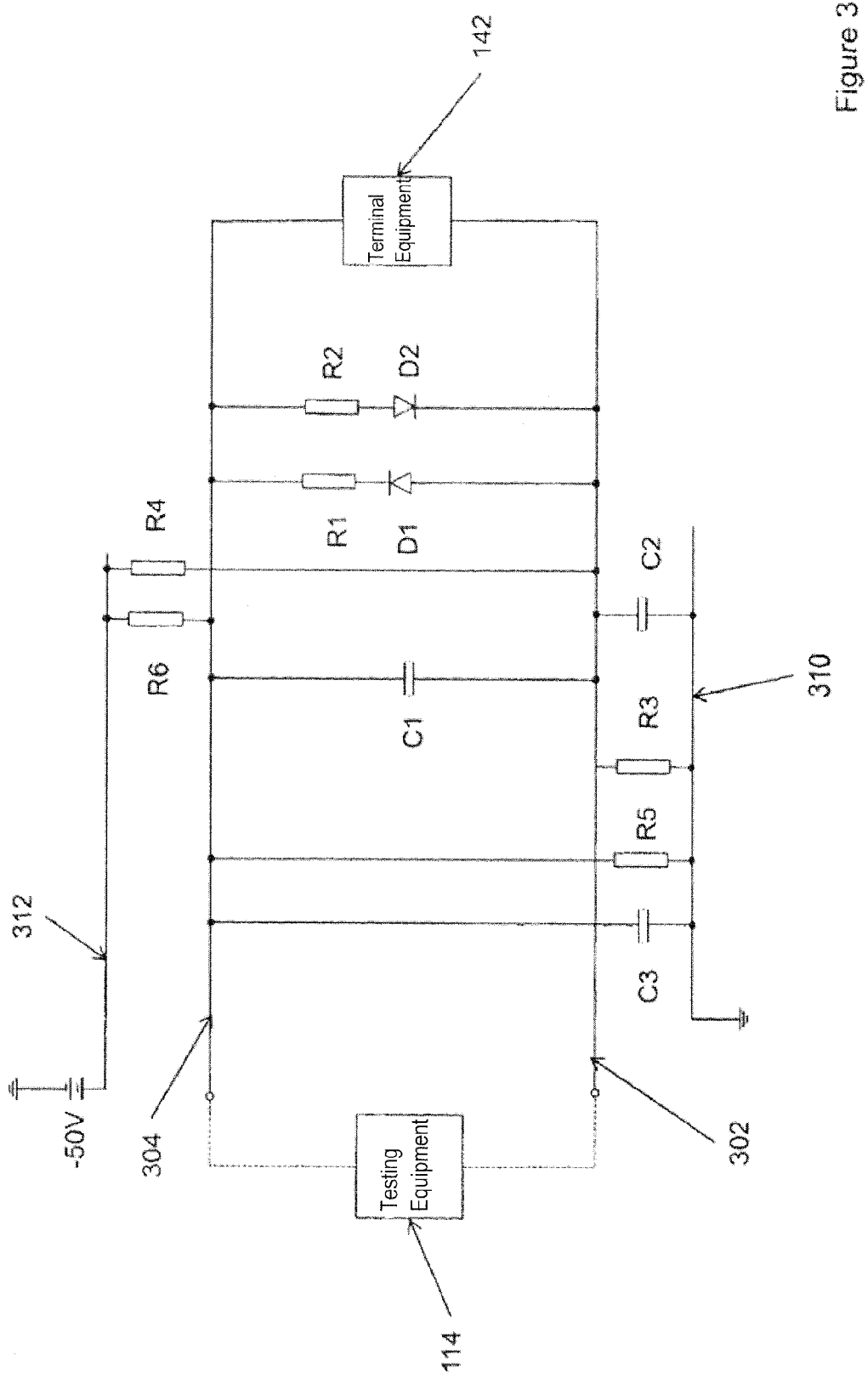
FIG. 3 shows a schematic depiction of a line under test.

Results taken from more than 2,000,000 measurements that have been taken on the applicant's network have shown that the average capacitance value between the A wire and the B wire (that is, referring to FIG. 3, $C_3$) is 60 nF km$^{-1}$. Similarly, the average loop resistance, $R_L$ (the sum of $R_3$ and $R_6$) is 218 Ωkm$^{-1}$ and the average insertion loss at 1600 Hz is 2.1 dB km$^{-1}$. Additionally, the test equipment used to measure the insertion loss adds an additional 0.5 dB to the insertion loss and this must also be corrected for.

Table 1 below shows examples of measured parameter values and the derived length values that can be calculated based on the average parameter values discussed above. By using the weighting values discussed above it is possible to determine that the weighted length value is 4.77 km. It has been observed that an estimation of the quality of a line can be made by comparing the determining the ratios of the lengths derived from the measured cable parameters and the weighted length value. These ratios are shown in Table 1 below.

TABLE 1

Examples of measured parameters and derived length values

| Parameter | Capacitance | Insertion Loss | Loop Resistance |
|---|---|---|---|
| Measured Value | 274 nF | 10.8 dB | 1150 Ω |
| Derived Length Values | 4.56 km | 4.90 km | 5.27 km |
| Ratio of Derived Length to Weighted Length | 0.96 | 1.03 | 1.10 |

For example, a line may be regarded as having an acceptable performance if all of the ratios of derived length to weighted length are within a first predefined interval. If one or more of the ratios are outside the first predefined interval yet within a second predefined interval then this may be an indication that the line merits further investigation into a condition which may eventually develop into a fault. If one or more of the ratios are outside of the second predefined interval then this may indicate that a fault condition is present on the line which needs to be located and remedied. Alternatively, if one or more of the ratios are outside the first predefined interval then this may indicate that a fault condition is present on the line which needs to be located and remedied.

Figure 4:
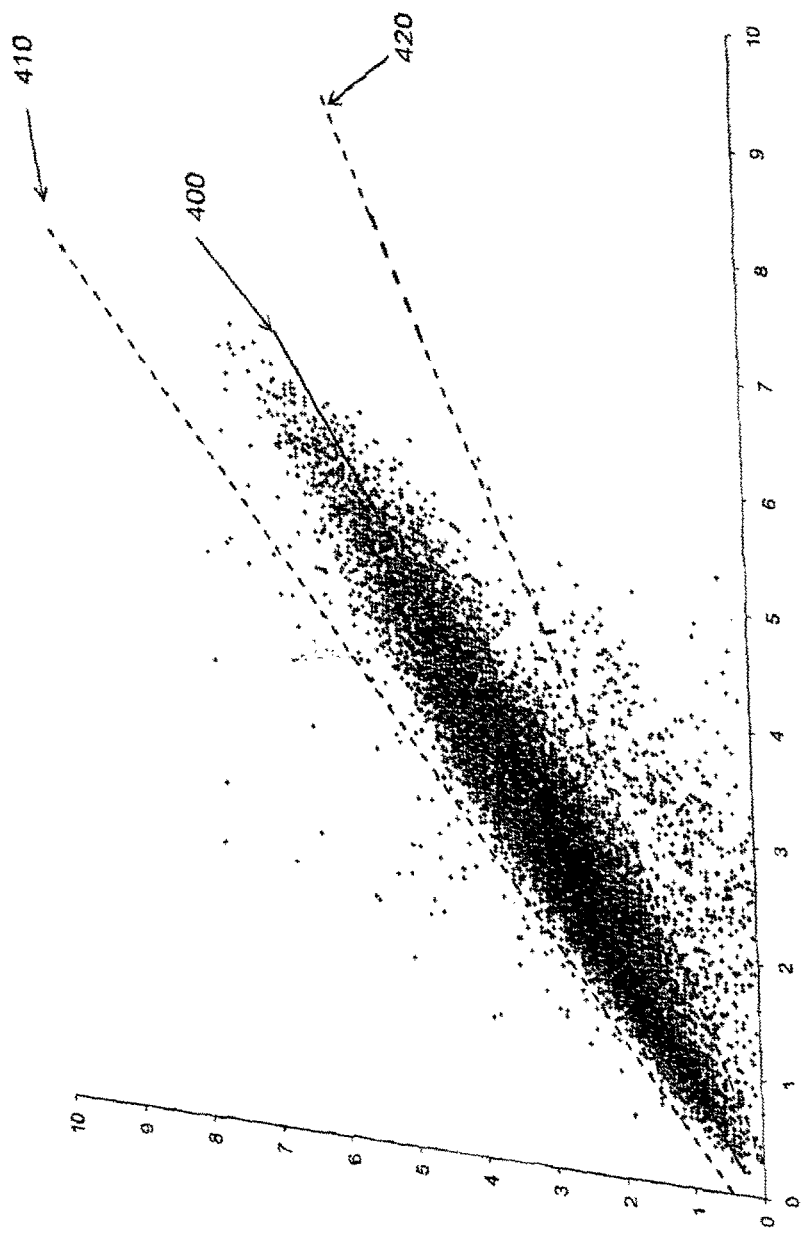
FIG. 4 shows a graphical depiction of insertion loss measurements at 1600 Hz taken from a copper access network.
Figure 5:
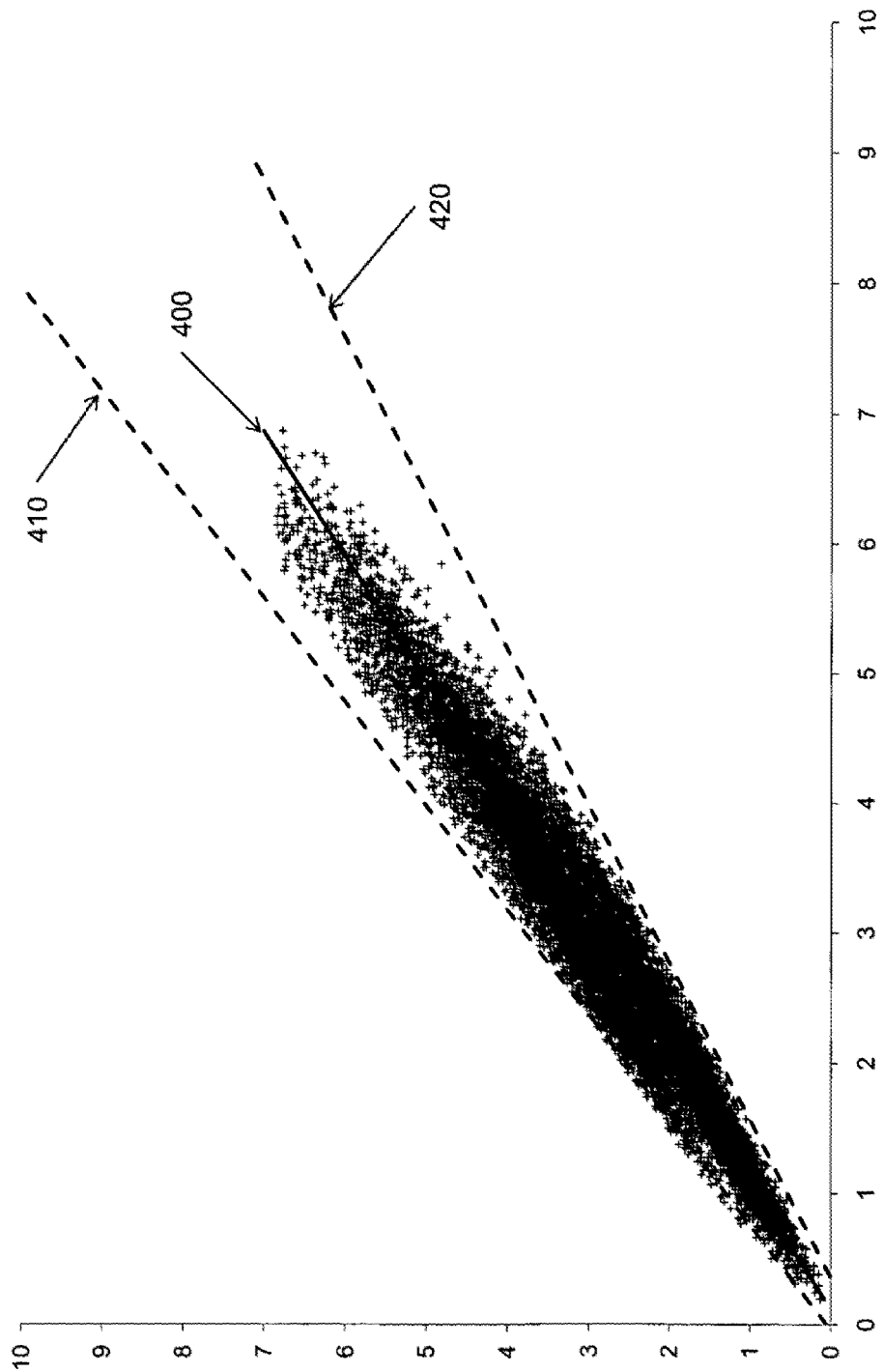
FIG. 5 shows a graphical depiction of capacitance measurements taken from a copper access network.
Figure 6:
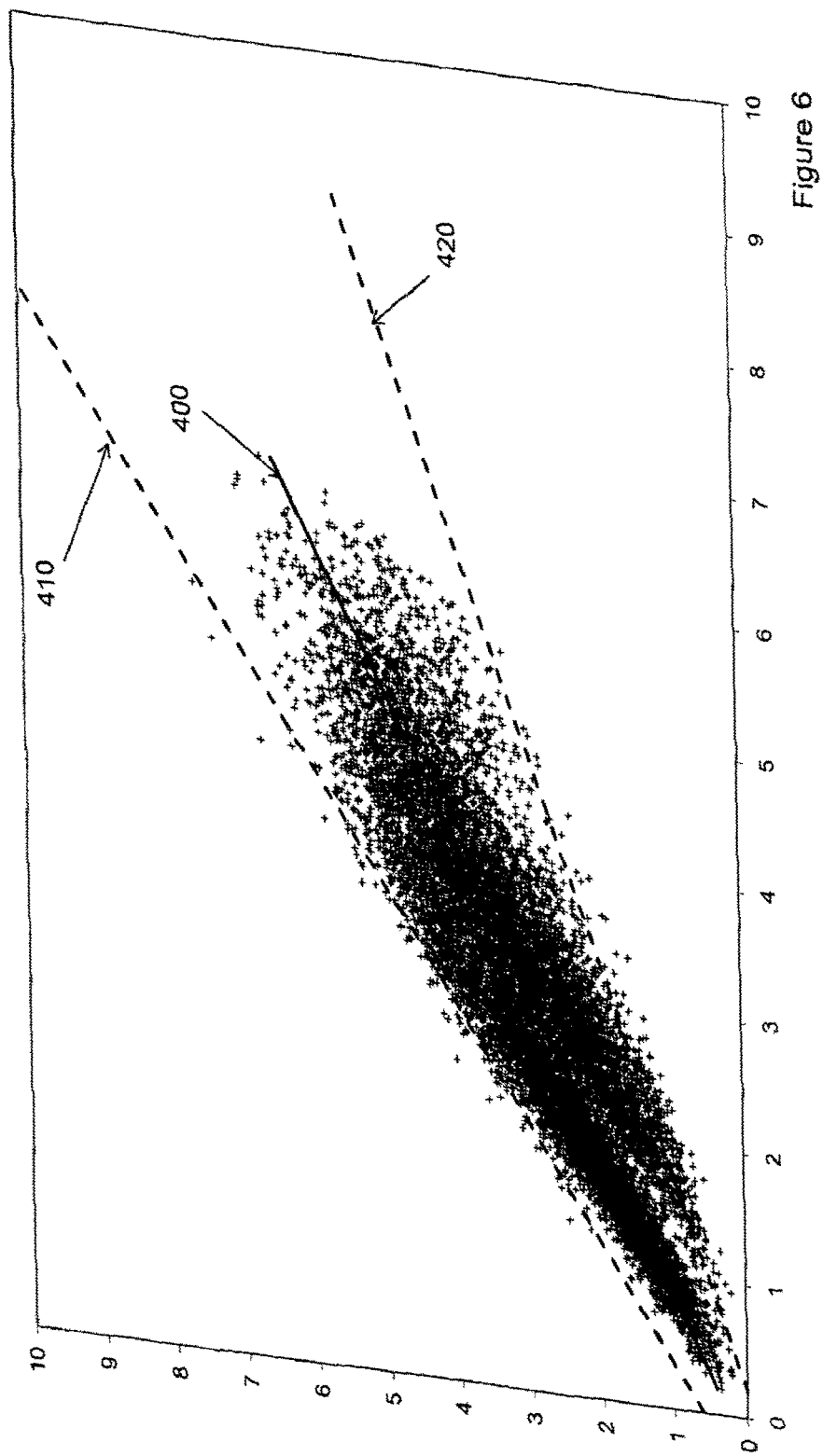
FIG. 6 shows a graphical depiction of loop resistance taken from a copper access network.

FIGS. 4 to 6 show graphical depictions of the relationship between the derived length value and the weighted line length for insertion loss (FIG. 4, insertion loss being measured at 1600 Hz), capacitance (FIG. 5) and loop resistance (FIG. 6). It can be seen from FIGS. 4 to 6 that there is a linear relationship between the derived length value and the weighted line length. The graphs are based on measurements taken from nearly 13000 lines in a copper access network. It can be seen from FIGS. 4 to 6 that the vast majority of data points form a lobe orientated at approximately 45°. FIGS. 4 to 6 also show a linear fit to the data points 400 along with an upper bound 410 and a lower bound 420.

The upper and lower bounds are defined in order that a certain proportion of the data points are contained within upper and lower bounds. The upper and lower bounds may be defined such that 95%, for example, of the data points are held within the cone. It should be understood that the upper and lower bounds may be defined such that a different proportion of the data points are included within the cone, or the upper and lower bounds may be defined using different criteria or parameters, for example statistical parameters which are derived from the distribution of data points, such as, for example the coefficient of variance of the distribution of data points.

It is possible to use the upper and lower bounds to determine the predefined intervals which can be used to determine whether a ratio of derived length to weighted length is acceptable or not. It will be understood that the intervals will be different due to the different distribution of data points associated with the different parameters and also that the intervals need not be symmetrical.

It will be understood by those skilled in the technical field of network testing that there are a large number of different techniques by which the different ratios can be processed and then presented to a user via the user interface of a piece of test equipment. The following discussion provides a description of a single example of the present invention which should not be regarded as a limitation of the broader techniques set out and described in the present application.

In one particular implementation of the present invention, the derived length value can be plotted against the weighted value for each of the parameters of interest. The position of a data point relative to the cone shape defined by the upper and lower bounds of the distribution of data points can be used as an indicator of the condition of a line which has been tested. A data point that is near to the central axis of the cone is one which will have a ratio of derived length to weighted length having a suitable value, indicating that the associated line is in a good condition. Those data points that are outside of the cone are those which are associated with lines which are more likely to be in a failure condition or in which a failure condition is likely to develop in due course.

It can be seen from FIGS. 4 to 6 that each of the cones, even when the cones are defined so as to comprise identical proportions of the data set, will have different parameters (for example, the gradient of the upper and lower bounds, the points of intersection with the axes, etc.). It will be understood that it is a relatively straightforward matter to transform the various cones such that their relative magnitudes are equalised and the upper and lower bounds are rotated such that they are symmetrical with regard to the x-axis. This then allows test measurements taken for different parameters to be displayed within a single graph.

Figure 7:
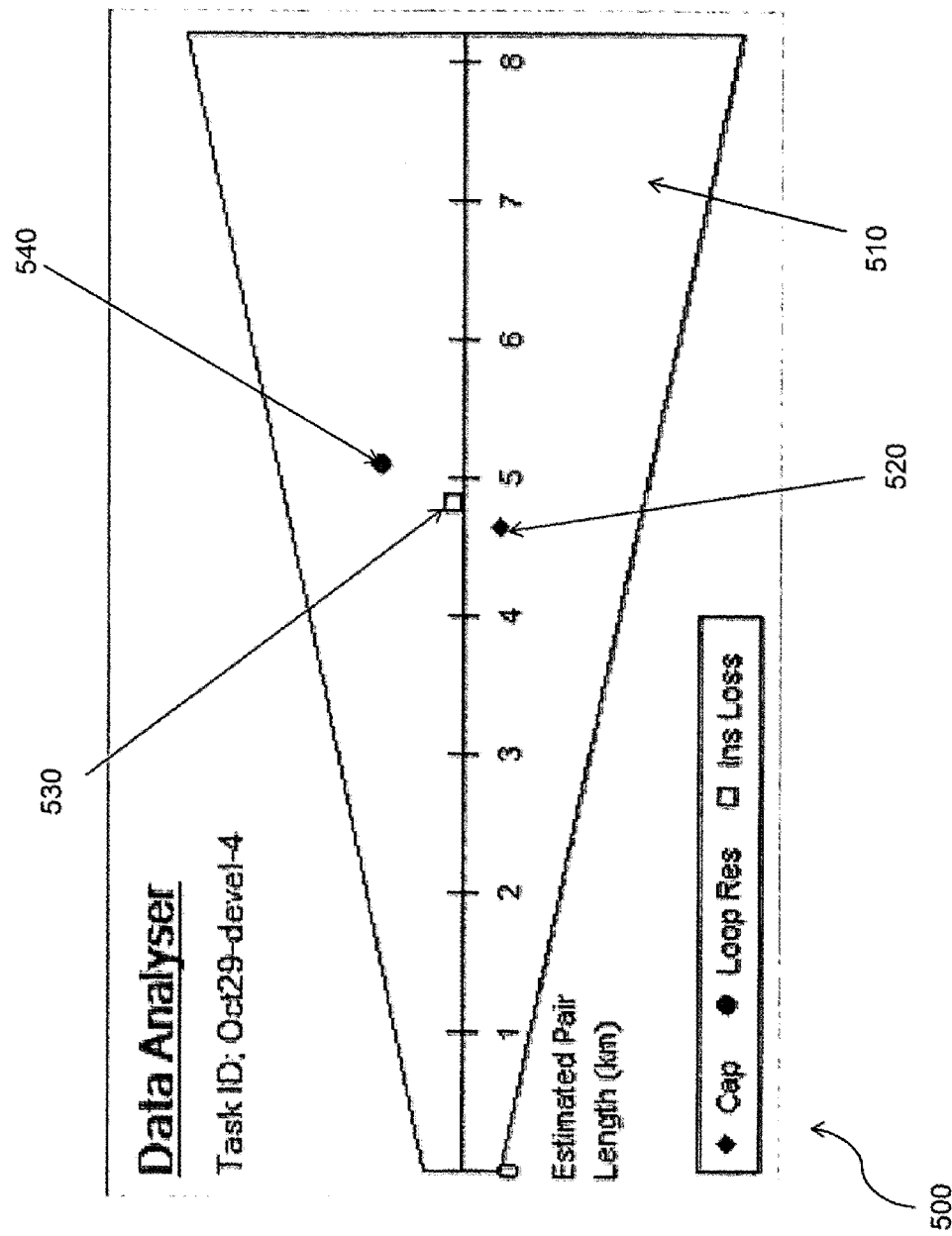
FIG. 7 shows an extract from a screen shot taken from an application which implements the present invention.

FIG. 7 shows an extract from a screen shot 500 taken from an application which implements the present invention. FIG. 5 shows a single cone 510 which comprises 3 data points, which relate to the capacitance 520, insertion loss 530 and loop resistance 540 measurements. Those data points that are closest to the horizontal axis of the cone represent parameter measurements which are relatively closest to the center of the distribution for that parameter. Those data points that are further from the central axis (and closer to the limits of the cone 510) represent parameter measurements which are relatively further from the center of the distribution for that parameter (and thus closer to either the upper (or lower) bound for that parameter). Data points which are outside of the cone 510 represent data points that are outside either the upper or lower bound shown in FIGS. 4 to 6.

A cone analysis as discussed above with reference to FIG. 7 is an easy and convenient method of displaying to an engineer the condition of a particular line when measured using a method according to the present invention. For example, if the data points representing the resistance and insertion loss are good (that is, near to the x-axis of the cone) whilst the data point representing the capacitance has a high value (that is, near to or beyond the limit of the cone above the x-axis) then this is indicative that the copper pair under test has an electrical connection to a spare pair. Similarly, if the data points representing the capacitance and insertion loss are good whilst the data point representing the resistance has a high value then this is indicative that one of the joints on the copper pair under test has an unacceptably high resistance and if the data points representing the resistance and capacitance are good whilst the data point representing the insertion loss has a high value then this is indicative that one of the joints on the copper pair under test may be bad.

It will be understood that the cone analysis shown in FIG. 7 might be displayed along with the values of other measured parameters or indications of the quality or acceptability of other cable parameters or telephony and/or data services that might be carried over the copper pair under test.

Figure 8:
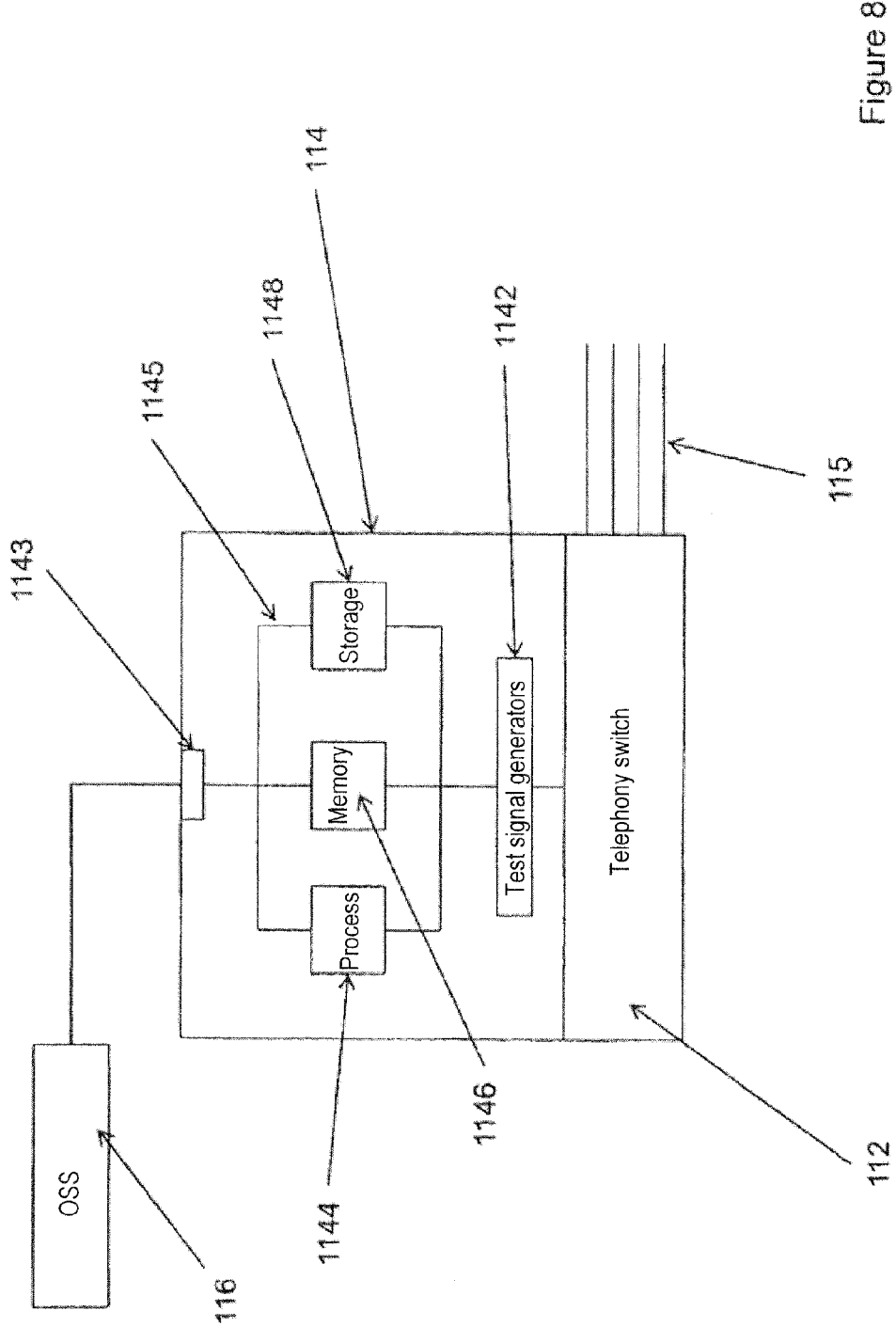
FIG. 8 shows a schematic depiction of network sting equipment according to the present invention.

FIG. 8 shows a schematic depiction of network testing equipment 114 according to the present invention. The network testing equipment is connected to the telephony switch 112 such that test signals can be applied to the exchange cables 115. The network testing equipment comprises test signal generators 1142, processing unit 1144, memory means 1146 and data storage means 1148. The network testing equipment further comprises a communications interface 1143 that allows data to be transmitted to and received from the OSS 116 and a data bus 1145 which interconnects the interface 1143 with the test signal generators 1142, processing unit 1144, memory means 1146 and the data storage means 1148.

In use, the processing unit controls the test signal generators such that appropriate test signals are generated and applied to the lines which are of interest. The response of the line to the test signals can be measured and the parameters of interest determined. Using the pre-determined average parameter values per kilometer length, the processing means can determine the derived length for each of the parameters of interest and then the weighted average length. Once the weighted average length has been calculated then it is possible to determine the condition of the line, for example by computing the ratios of the derived length to the weighted average length for each of the parameters of interest or by computing a cone analysis. The measured responses and all calculated data can be stored within the data storage means 1148. Periodically the data stored within the testing equipment may be sent to the OSS.

Software to interpret the line measurements, calculate the parameters of interest and then compute any analysis of the parameters is also stored within the data storage means 1148. In operation this software will be copied into the memory means and then executed by the processing unit in order to implement a method according to the present invention. The data storage means may also store further software which is necessary for the operation of the network testing equipment and for communicating with the OSS and the telephony switch. It will be understood that some of the functionality of the network testing equipment may be implemented within either the telephony switch and/or the OSS. In addition to testing parameters of the copper pair that comprises the transmission line, the network testing equipment may also be configured so as to perform tests that indicate the capability of the transmission lines to carry data signals, for example DSL signals.

Figure 9:
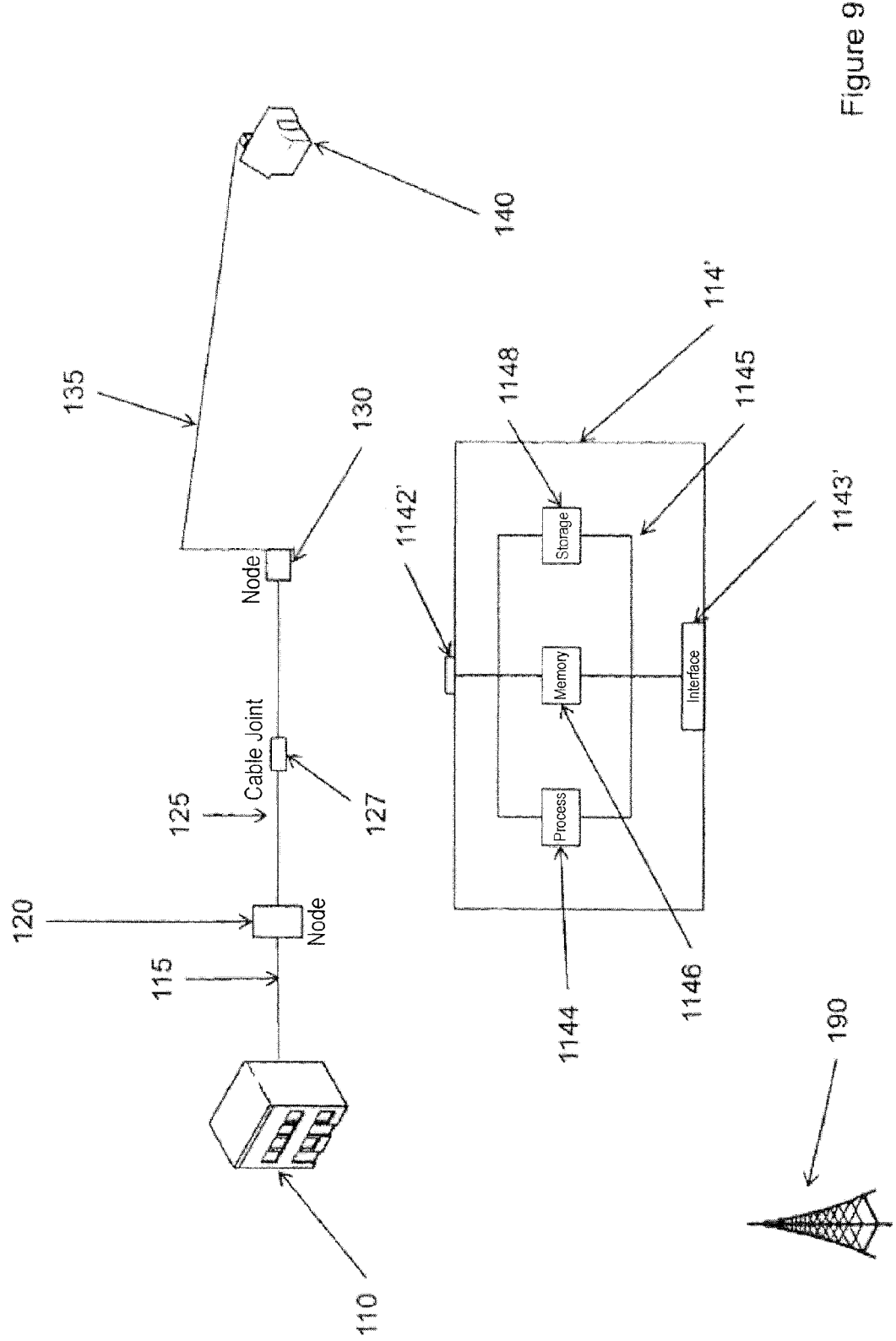
FIG. 9 shows a schematic depiction of an alternative embodiment of network testing equipment according to the present invention.

FIG. 9 shows a schematic depiction of an alternative embodiment of network testing equipment according to the present invention. FIG. 9 also shows an exemplary single line in a conventional access network, running from the local exchange 110 to the customer premises 140, via the exchange cable 115, primary node 120, distribution cable 125, secondary node 130 and drop wire 135. Furthermore, the distribution cable is divided into two portions which are connected together at cable joint 127.

Whereas the network testing equipment described above with reference to FIG. 8 is of value when periodically testing portions of the access network, there is also a need for a portable network test apparatus 114', which is also shown in FIG. 9. Such a portable network test apparatus can be used by an engineer to test the network when a fault is reported by a customer or to verify that a repair has been made appropriately.

Portable network test apparatus 114' comprises test interface leads 1142', processing unit 1144, memory means 1146 and data storage means 1148. The network testing equipment further comprises a communications interface 1143 and a data bus 1145 which interconnects the interface 1143 with the test interface leads 1142', processing unit 1144, memory means 1146 and the data storage means 1148.

The test interface leads 1142' can be connected to a particular pair of copper wires at either the primary node, the secondary node, a cable joint or at any other network location where the cable pairs are accessible. The test interface leads 1142' can be connected to the copper pair and the processing unit 1144 causes appropriate test signals to be generated and applied to the copper pair under test. The response of the line to the test signals can be measured and the parameters of interest determined. Using the pre-determined average parameter values per kilometer length, the processing means can determine the derived length for each of the parameters of interest and then the weighted average length. Once the weighted average length has been calculated then it is possible to determine the condition of the line, for example by computing the ratios of the derived length to the weighted average length for each of the parameters of interest or by computing a cone analysis. The measured responses and all calculated data can be stored within the data storage means 1148.

Software to interpret the line measurements, calculate the parameters of interest and then compute any analysis of the parameters is also stored within the data storage means 1148. In operation this software will be copied into the memory means and then executed by the processing unit in order to implement a method according to the present invention. The communications interface 1143 may be, for example, a cellular data modem such that the portable network test apparatus 114' can transmit data to the OSS via a wireless network 190. The test apparatus may also receive instructions from the OSS for the engineer operating the test apparatus, for example detailing subsequent cables to be tested and/or other jobs which have been scheduled to be performed by the engineer. Alternatively, or in addition, the network interface may allow the portable network test apparatus to be connected to a fixed network port such that data can be exchanged between the portable network test apparatus and the OSS.

It will be understood that such an apparatus may perform the method according to the present invention on its own or in addition to other testing, fault identification or fault location techniques, such as those disclosed in the applicant's earlier patent applications, for example WO04/086738, WO01/76209 or WO01/76208. Furthermore, the apparatus may comprise additional test modules that enable it to test for other parameters which relate to the state of the copper pairs which comprise the transmission line, or to send and analyse data signals such that the ability of the transmission line to carry data services, such as DSL, for example.

A portable network test apparatus according to the present invention may be a standalone unit. For example, test apparatus such as the EXFO AXS-200 or the JDSU HST-3000C may be modified by the provision of additional software in order to be able to implement the present invention.

Alternatively, it may be a suitably adapted laptop computer (or similar), such as a Panasonic™ Toughbook™ with additional software and hardware to enable the functionality of the test apparatus to be implemented. In such a case, the data storage means will additionally store operating system software, one or more further applications and data which has been generated by, or is used by, the computer.

Computer software suitable for implementing a method according to the present invention may be provided by a download, for example via the internet, or on some physical media, for example, DUD, CD-ROM, USB memory stick, etc.

What is claimed is:

1. A method of testing a transmission line in a communications network, the communications network comprising a local exchange and a plurality of transmission lines connected to the local exchange, the method comprising the steps of:
   i) measuring a value for each of a plurality of transmission line parameters;
   ii) determining an estimate for the length of the transmission line for each of the plurality of transmission line parameters based on the associated value measured in step i) and a pre-determined further value associated with each of the plurality of transmission line parameters;
   iii) determining a weighted average transmission line length based on the plurality of transmission line length estimates determined in step ii); and iv) inferring the condition of the transmission line based on the weighted average determined in step iii) and the plurality of transmission line length estimates determined in step ii).

2. A method according to claim 1, wherein in step iv) a ratio of the estimated transmission line length to the weighted average transmission line length is determined for each of the plurality of transmission line parameters and the condition of the transmission line is inferred in accordance with the plurality of ratios.

3. A method according to claim 2, wherein in step iv), the condition of the transmission line is inferred as being acceptable if each of the plurality of ratios determined in step iv) are less than a first predetermined value.

4. A method according to claim 2, wherein it is inferred that the transmission line may have an unacceptable condition in the future if each of the plurality of ratios determined in step iv) are greater than a first predetermined value but less than a second predetermined value.

5. A method according to claim 2 in step iv), it is inferred that the transmission line has an unacceptable condition if each of the plurality of ratios determined in step iv) are greater than a predetermined value.

6. A method according to claim 1, wherein step iv) comprises the further steps of:
　a) for each of the plurality of transmission line parameters, determining a data point based on the weighted average transmission line length and the transmission line length estimate associated with each of the transmission line parameters;
　b) comparing the data point determined in step a) against a pre-determined distribution of data points; and
　c) inferring the condition of the transmission line based on the comparison made in step b).

7. A method according to claim 6, wherein in step c), the transmission line is determined to have an acceptable condition if each of the data points determined in step a) is less than an upper bound and greater than a lower bound, the upper and lower bounds being determined from the distribution of data points.

8. A method according to claim 6, wherein in step c), the transmission line is determined to have an unacceptable condition if one or more of the data points determined in step a) is greater than the upper bound or lower than the lower bound.

9. A method according to claim 6, wherein the upper bound and the lower bound comprise a pre-determined proportion of the data points which comprise the distribution of data points.

10. A method according to claim 6, wherein the upper bound and the lower bound are defined in accordance with a statistical parameter derived from the pre-determined distribution of data points.

11. A method according to claim 10, wherein the statistical parameter is the coefficient of variance of the pre-determined distribution of data points.

12. An apparatus comprising a processing unit, memory means and data storage means, the apparatus being configured, in use, to perform a method according to claim 1.

13. An apparatus according to claim 12, wherein the apparatus comprises a portable network testing apparatus.

14. A non-transitory data carrier for use in a computing device, the data carrier comprising computer executable code which upon execution by the computing device provides steps for testing a transmission line in a communications network, the communications network comprising a local exchange and plurality of transmission lines connected to the local exchange, the steps comprising:
　i) measuring a value for each of a plurality of transmission line parameters;
　ii) determining an estimate for the length of the transmission line for each of the plurality of transmission line parameters based on the associated value measured in step i) and a pre-determined further value associated with each of the plurality of transmission line parameters;
　iii) determining a weighted average transmission line length based on the plurality of transmission line length estimates determined in step ii); and
　iv) inferring the condition of the transmission line based on the weighted average determined in step iii) and the plurality of transmission line length estimates determined in step ii).

15. An apparatus for testing a transmission line in a communications network, the communications network comprising a local exchange and a plurality of transmission lines connected to the local exchange, the apparatus comprising: a computer processor and a data storage medium, the apparatus being at least configured to:
　i) measure a value for each of a plurality of transmission line parameters;
　ii) determine an estimate for the length of the transmission line for each of the plurality of transmission line parameters based on the associated measured value and a pre-determined further value associated with each of the plurality of transmission line parameters;
　iii) determine a weighted average transmission line length based on the determined plurality of transmission line length estimates; and
　iv) infer the condition of the transmission line based on the determined weighted average and the determined plurality of transmission line length estimates.

16. The apparatus according to claim 15, wherein a ratio of the estimated transmission line length to the weighted average transmission line length is determined for each of the plurality of transmission line parameters and the condition of the transmission line is inferred in accordance with the plurality of ratios.

17. The apparatus according to claim 16, wherein the condition of the transmission line is inferred as being acceptable if each of the determined plurality of ratios are less than a first predetermined value.

18. The apparatus according to claim 16, wherein the apparatus is at least further configured to infer that the transmission line may have an unacceptable condition in the future if each of the determined plurality of ratios are greater than a first predetermined value but less than a second predetermined value.

19. The apparatus according to claim 16, wherein the apparatus is at least further configured to infer that the transmission line has an unacceptable condition if each of the determined plurality of ratios are greater than a predetermined value.

20. The apparatus according to claim 15, wherein the apparatus is at least further configured to:
　a) for each of the plurality of transmission line parameters, determine a data point based on the weighted average transmission line length and the transmission line length estimate associated with each of the transmission line parameters;
　b) compare the determined the data point against a pre-determined distribution of data points; and c) infer the condition of the transmission line based on the comparison of the determined the data point against a pre-determined distribution of data points.

\* \* \* \* \*